United States Patent [19]
Jain et al.

[11] Patent Number: 5,565,987
[45] Date of Patent: Oct. 15, 1996

[54] FABRY-PEROT PROBE PROFILOMETER HAVING FEEDBACK LOOP TO MAINTAIN RESONANCE

[75] Inventors: Kanti Jain, Briarcliff Manor; Subhash Chandra; Carl C. Kling, both of Armonk, all of N.Y.

[73] Assignee: Anvik Corporation, Hawthorne, N.Y.

[21] Appl. No.: 410,422

[22] Filed: Mar. 23, 1995

[51] Int. Cl.$^6$ ........................................... G01B 9/02
[52] U.S. Cl. ............................................ 356/352; 356/357
[58] Field of Search .................... 356/352, 357, 356/359, 360, 358; 73/105; 250/306, 307

[56] References Cited

U.S. PATENT DOCUMENTS

| | | | |
|---|---|---|---|
| 4,153,370 | 5/1979 | Corey | 356/358 |
| 4,717,255 | 1/1988 | Ulbers | 356/358 |
| 5,193,383 | 3/1993 | Burnham et al. | 73/105 |
| 5,225,888 | 7/1993 | Selwyn et al. | 356/352 |
| 5,305,330 | 4/1994 | Rieder et al. | 356/352 |

FOREIGN PATENT DOCUMENTS

| | | | |
|---|---|---|---|
| 0440268 | 8/1991 | European Pat. Off. | 356/352 |
| 0539321 | 4/1993 | European Pat. Off. | 356/352 |

*Primary Examiner*—Samuel A. Turner
*Attorney, Agent, or Firm*—Carl C. Kling

[57] ABSTRACT

This invention describes a surface profilometry system which measures the surface topography of a sample on a sub-nanometer scale. The surface profile is determined through measurement of the change in distance between two mirrors of a multi-pass resonant cavity that is referenced to a frequency stabilized laser source. The contact stylus is in contact with the sample as it is translated along the plane to be measured. As the stylus traverses the sample, it is vertically deflected and transfers the motion directly to one of the mirrors of a multi-pass resonant cavity. The cavity is referenced to a frequency stabilized laser source that is synchronized with the resonant modes of the multi-pass cavity. Very small sub-nanometer deviations of the cavity can be detected by monitoring the laser beam incident on the multi-pass cavity. There are two embodiments by which the cavity length changes can be measured. The first embodiment involves adding variable frequency sidebands onto the stabilized laser through the use of an optical modulator. As the resonant cavity changes length due to the motion of the stylus, the modulation frequency is varied so that the sideband is kept on resonance with the cavity mode. The second embodiment involves monitoring the direct output of the stabilized laser beam after reflection from the resonant cavity. A position actuator adjusts the length of the cavity to maintain the resonance condition between the cavity mode and the stabilized laser beam.

14 Claims, 4 Drawing Sheets

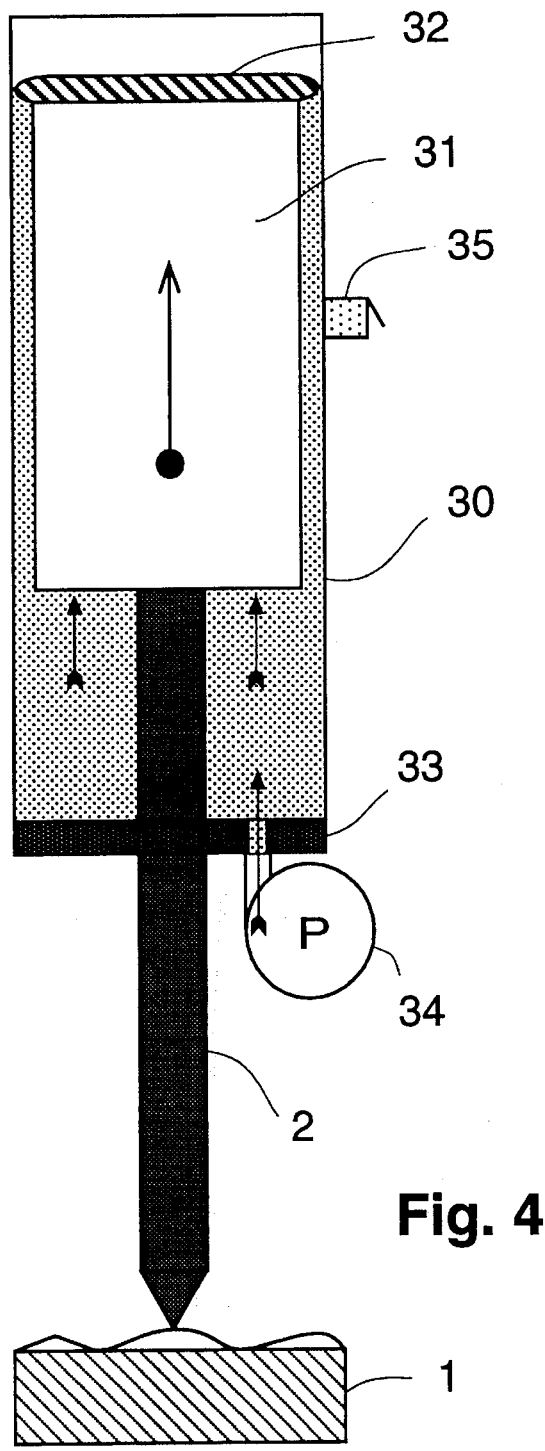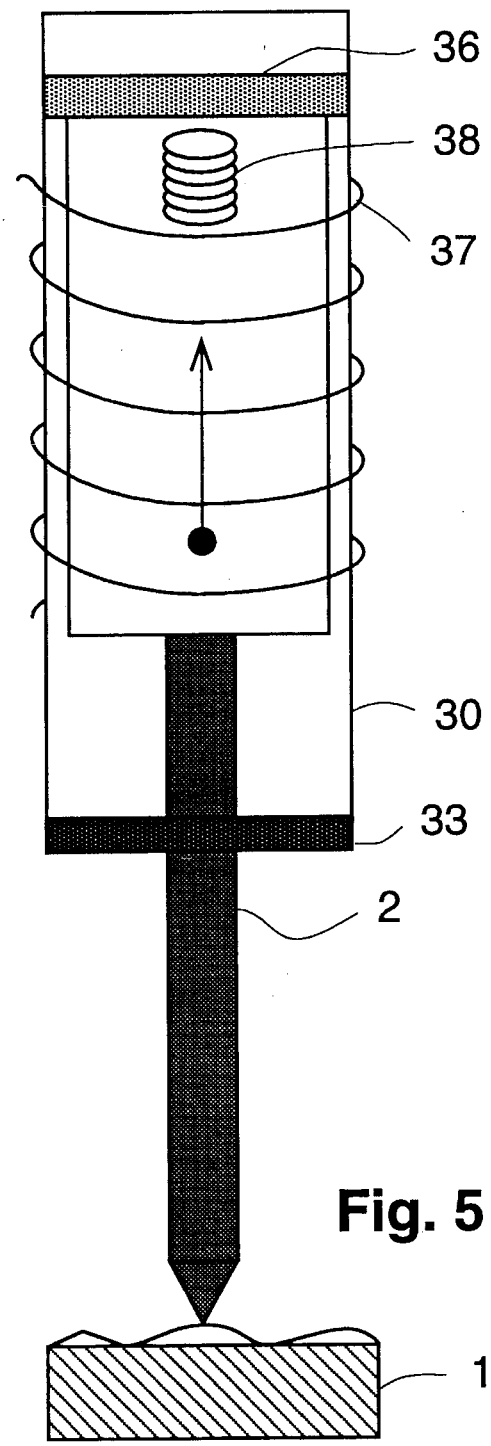
Fig. 4
Fig. 5

FABRY-PEROT PROBE PROFILOMETER HAVING FEEDBACK LOOP TO MAINTAIN RESONANCE

BACKGROUND OF THE INVENTION

1. Field of the Invention

This invention relates to precision measurements of surface topography, and specifically relates to profilometry and related measurement techniques utilizing contact probing of a surface to measure topographical features on a sub-nanometer scale, through measurement of the change in distance between two mirrors of a multi-pass resonant cavity that is referenced to a frequency stabilized laser source.

2. Summary of the Prior Art

Some of the hardware useful in implementing this invention has already been described in a high-precision alignment system disclosed in U.S. Pat. No. 4,991,962, granted Feb. 12, 1991, to K. Jain, one of the co-inventors of this patent application. The high-precision alignment system of U.S. Pat. No. 4,991,962 features optical and electro-mechanical feedback positioning mechanisms. This configuration includes a Fabry-Perot resonator, with associated electro-optical components, in a system which compares two laser frequencies, by an optical heterodyne technique, to eliminate lateral displacement of mask and sample in an imaging environment. The cavity spacing in the Fabry-Perot resonator is monitored to provide a feedback signal which is used to reposition a mask in exact alignment with a wafer.

Current Profile Measurement Techniques and Their Limitations

There are several techniques for vertical profile measurements that are commonly used in fabrication of very high-density, high-performance integrated circuits (IC's). Only a brief discussion of these will be given here because these techniques are well known and instruments based on them are available from many suppliers.

A. Scanning Electron Microscopy (SEM)

This technique is widely used in microelectronics fabrication and there are numerous manufacturers that make scanning electron microscopes (SEM's). However, the following difficulties and limitations are encountered in obtaining valuable information from this technique:

(i) For obtaining good quality imaging, the sample must be either conductive or it must be coated with a thin conductive film. The coating can change the sample profile and may be deleterious to the environment of the coating chamber. In addition, the coating may alter the nature of the sample itself.

(ii) The surface profiles are obtained by placing the sample in a small vacuum chamber of the SEM system. This requirement leads to two practical problems: (a) the sample must be small enough to fit inside the vacuum chamber, and (b) a valuable sample may be damaged due to occasional mishap with oil or contamination associated with vacuum pumps.

(iii) Accurate vertical profiles can be obtained only when a sectional cut of the sample can be made. Such cuts are practical when the sample is prepared on a substrate that can be cleaved, e.g., a silicon wafer. These requirements result in the following serious restrictions and difficulties:

(a) choice of substrate materials is severely restricted;

(b) specialized skills are needed for cleaving the substrate; and (c) it is a destructive technique.

B. Contact Stylus Probe Technique

In this mechanical technique, a very delicate stylus traverses the sample surface while maintaining contact with it. Vertical movements are measured by monitoring strain variations in the stylus carrier produced by the vertical motion of the stylus. Commercial instruments based on this technique include Sloan DekTak and Tencor AlphaStep which are frequently used during fabrication of IC's.

A major drawback of this technique lies in the tact that it is a mechanical technique in which high sensitivity to vertical displacement of the stylus is achieved by making the stylus structure extremely delicate. Consequently, the linear scan of the stylus must be made at a very slow speed. On the other hand a certain amount of tracking force must be applied so that the stylus follows the topography of the sample. Furthermore, when a rough surface is scanned for texture measurement, the frequency spectrum of the vertical motion of the stylus can overlap the resonant frequencies of the stylus structure causing erroneous readings of the surface profile.

C. Optical Interference Probes

A wide variety of optical interferometric configurations for height measurement are possible and have been reported in the literature Instead of discussing them individually, some general remarks will be more useful. A major advantage of optical probes is their non-contact measurement capability. Interferometric probes are also capable of making height measurements in some applications where light is reflected from a highly polished texture-free surface. In case of rough surfaces, however, the accuracy of height measurement is greatly reduced due to the light scattered from the textured surface. Therefore, optical probes are not ideally suited for making very precise measurements of rough surfaces.

Another well-known difficulty with interferometric techniques is encountered when the sample surface is covered with a transparent thin film of variable thickness. Under these situations the optical intensity variations due to interference of the light reflected from the top and bottom surfaces of the thin film cannot be easily decoupled from the interferometric effects from the surface profiles.

In addition to the above techniques, various atomic-level measurement techniques have been developed such as scanning tunneling microscopy (STM) and atomic-force microscopy (AFM). Whereas the precision these techniques provide is unprecedented, they are limited in application to surface studies due to their very short range.

There are a number of techniques for measuring hardness of surfaces, generally involving penetrating of the surface with a robust probe driven with a known variable force. An extreme example of a sort of hybrid "contact-non-contact" stylus probe technique is: POHL, European Patent Application 0 440 268 A2, ATOMIC FORCE SENSOR HEAD WITH INTERFEROMETRIC MEASUREMENT OF THE PROPERTIES OF A DATA STORE, Aug. 7, 1991. Pohl shows a stylus tip integral with a mirrored cantilever beam, the mirror being one of the two mirrors of a Fabry-Perot optical cavity. The optical cavity and its associated detector serves as a sensor head for two differing deflections of the cantilever beam. The deflections of the cantilever beam reflect binary data bits exhibited as two differing atomic forces (van der Waals, covalent, ionic or repulsive interaction forces) expressing data bit "one" and data bit "zero." The atomic force is the attraction of the "... nearmost atoms at tip and surface [which] interact. . . " (Column 3, lines 39–52 of Pohl) Note that this atomic force is so tiny that the entire mechanism ". . . should be operated under vacuum." (Column 3, lines 39–41) The atomic force is in the range of $10^{22}$–$10^{-18}$ Joule. (Column 3, lines 33–36 of Pohl) The cantilever beam is balanced by a spring. . . " (Column 3, lines 54–55 of Pohl) Pohl does not show or suggest the use of frequency-stabilization for the laser, nor does Pohl show any optical-electronic feedback means responsive to dimensional change of the cavity to provide a displacement signal due to surface profile of a sample. Pohl does not include any means of keeping the Fabry-Perot cavity at resonance. Pohl, dealing with only a small number of atoms clustered between the probe point and the surface of the sample, does not need and does not have any measurable range. Pohl does not teach a contact or hardness test. Pohl does not use a feedback loop.

Burnham et aL, U.S. Pat. No. 5,193,383, MECHANICAL AND SURFACE FORCE NANOPROBE, Mar. 16, 1993, shows a tunnel piezoelectric manipulator probe-sensing-probe technique for an atomic force microscope. The sample probe tip 34 is held on a cantilever beam 36, with its tip point making a near-approach, contact or indentation of the sample 26. The tunnel tip 38 is manipulated into tunneling range of the sample probe 34 butt end to sense the exact deflection of the cantilever beam 36 due to atomic force. This is the sort of tunneling detection technique which Pohl wishes to supersede with his Fabry-Perot interferometer.

Selwyn et at., U.S. Pat. No. 5,225,888, PLASMA CONSTITUENT ANALYSIS BY INTERFEROMETRIC TECHNIQUES, Jul. 6, 1993, uses the well-known technique of keeping the Fabry-Perot cavity at resonance by using a piezoelectric driver to tune the cavity to resonance by moving one of the mirrors. Selwyn et aL tunes the interferometer to monitor trace constituent contamination by unwanted impurities which might affect transistor operation. Tuning the Fabry-Perot cavity (etalon) to a resonance frequency is the very nature of any Fabry-Perot cavity device, but Selwyn et al. does not remodulate for measurement.

Corey, U.S. Pat. No. 4,153,370, MICROINTERFEROMETER TRANSDUCER, May 8, 1979, describes an air-bearing probing device with the measuring device inside the tube, and using a single-frequency laser.

SUMMARY OF THE INVENTION

This invention uses an optical resonator and electromechanical feedback techniques to monitor and measure the displacement of a stylus probe tracing the surface of a sample. This differs from the prior art positioner in U.S. Pat. No. 4,991,962 which causes movement to eliminate an existing misplacement. A probe is rigidly mounted on one of the two cavity-defining mirrors of a Fabry-Perot resonator which is used as a sensor. A laser, stabilized to an atomic reference, is used to reference the multi-pass resonant cavity. The resonant cavity acts as an optical filter whose transmission frequency depends on the length of the cavity. If the length of the cavity is initially adjusted to transmit the stabilized laser frequency, then, upon movement of the probe and the attached mirror, the resonance condition is disturbed. The resonance condition is reestablished by moving the other mirror, or by creating a new sideband frequency of the laser light by optically mixing an appropriate RF frequency with the frequency of the laser light using an optical modulator. Thus, the frequency change necessary to reestablish a resonance condition in the Fabry-Perot resonator is a quantitative measure of the displacement of the stylus probe.

The object of the invention is to provide a simple, robust mechanism for measuring surface profiles with an accuracy in the sub-nanometer (Ångstrom) range.

Another object of the invention is to use feedback from the optical cavity resonator of a precision probe positioning mechanism to develop profile measurements by inferences taken from departures from resonance or returns to resonance as the probe is moved linearly as it follows a sample surface profile.

Still another object of the invention is to use the same probe positioning mechanism and optical cavity resonator both for surface profile measurements and for surface hardness measurements.

A feature of the invention is the use of a frequency stabilized laser, an optical cavity resonator, and an optical modulator to seek resonance of the optical cavity resonator following perturbation as a result of motion of a probe rigidly coupled to one of the two cavity defining mirrors of the optical resonator.

Another feature of the invention is the use of a stylus which is designed to be held in a fixture that provides the necessary tracking force and rigidly couples the stylus to one of two cavity-defining mirrors of the optical resonator.

Another feature of the invention is the use of the frequency-stabilized laser to provide an absolute calibration standard, and the use of the Fabry-Perot interferometer to translate the frequency standard of the laser to a fixed distance standard.

Still another feature of the invention is the means to hold the stylus so that the tracking force pushing the stylus against the sample is minimal and therefore does not damage the sample.

This invention provides some unique advantages over conventional means used to measure surface topography:

(i) The stylus tip is in physical contact with the sample so it does not suffer from the disadvantages associated with conventional optical techniques requiting that the surface be polished to minimize scattering.

(ii) The stylus tip can be of a sturdy design since there is no strain measurement of the tip as for conventional probing. A sturdier tip design reduces problems associated with mechanical resonances of the stylus.

(iii) This invention has a simple means for initiating contact with the sample before beginning horizontal scans to determine the surface profile.

(iv) This invention has a much higher sensitivity than conventional optical techniques due to the multi-pass resonant nature of the cavity attached to the stylus.

(v) Since the stabilized laser system is referenced to an atomic transition, it is self-calibrating and does not require calibration samples or procedures.

(vi) There are no limitations on the size of the sample since the stylus does not require any special environmental conditions.

(vii) Them am no special procedures for sample preparation such as metallization or coating.

(viii) The same hardware and operating algorithm can be used both to measure the surface topography and to measure the sample hardness at specific points.

Other objects, features and advantages of the invention will be apparent to those skilled in the art of precision positioning and measurement, using the following figures and explanation of a preferred embodiment as a guide.

DRAWINGS

FIG. 4 shows details of an air bearing stylus carrier.

FIG. 5 shows details of a magnetic stylus carrier.

DESCRIPTION OF A FIRST PREFERRED EMBODIMENT

Precision positioning techniques can be used for a wide variety of metrology systems, but we concentrate the discussion in this patent application to high-sensitivity measurements of vertical profiles, line widths, and surface textures in microelectronics fabrication.

The key differences between the U.S. Pat. No. 4,991,962 alignment system and this metrology system are:

(i) In this embodiment of the profilometry system, one mirror of the Fabry-Perot resonator is mounted on a stylus and the other is fixed; and (ii) upon movement of the Fabry-Perot mirror stylus, the radio frequency (RF) modulation frequency ($w_m$) is varied so as to match the resonance condition of the Fabry-Perot resonator. This $w_m$ is then an absolute measure of the movement of the stylus.

The key to this metrology technique features:

(i) a sturdy stylus to which one mirror of the optical resonator is tightly coupled; and (ii) a precise displacement measurement technique using a unique laser modulation spectroscopy concept.

Figure 1:
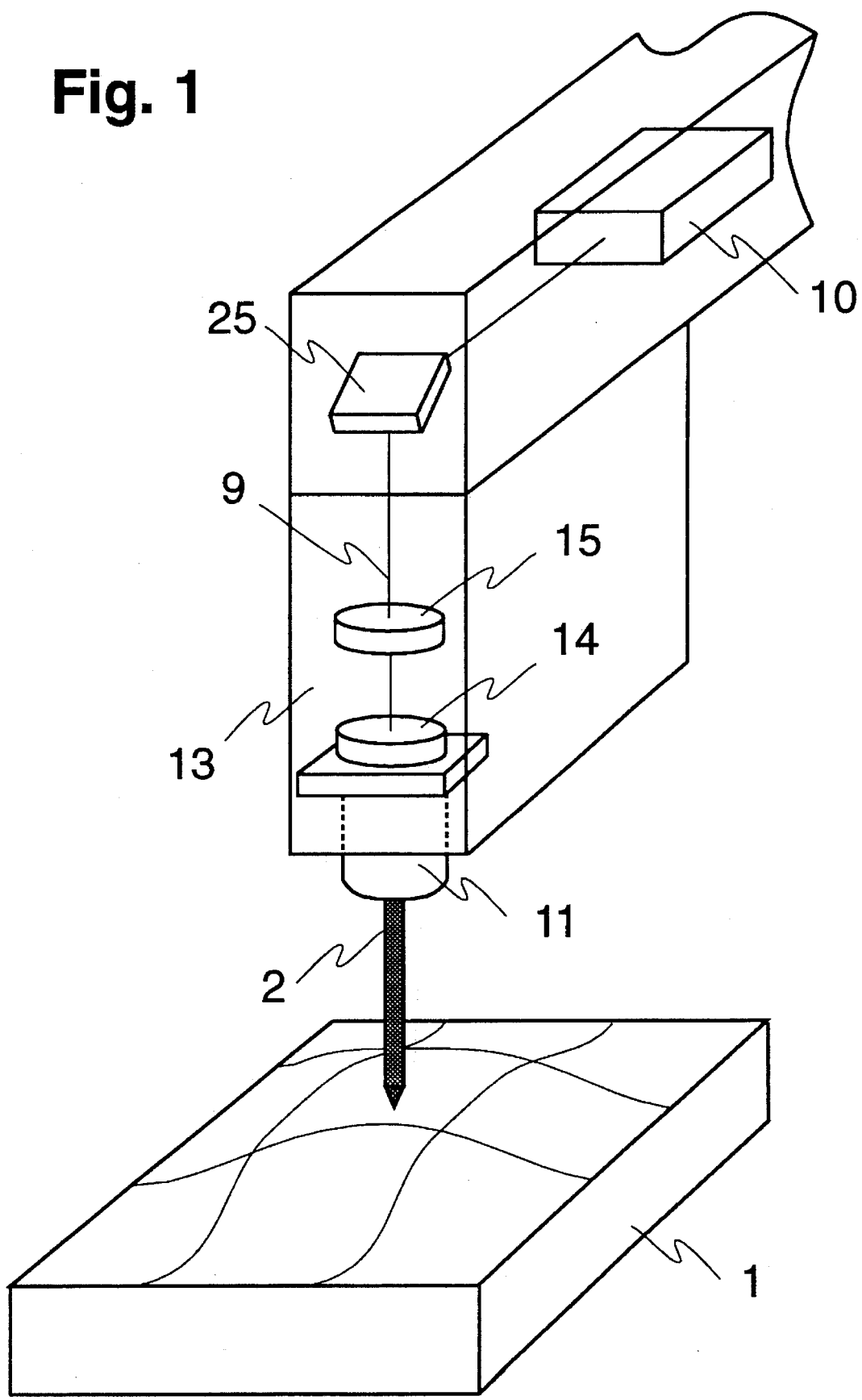
FIG. 1 is an overall schematic view of the invention featuring the multi-pass resonant cavity with one of the mirrors rigidly attached to the stylus in contact with the sample.

FIG. 1 shows the mechanism of the surface profilometer along with a sample to be measured. A stylus 2 is in physical contact with the sample 1 and is connected by a mounting component 11 to the first mirror 14 of the resonant cavity 13. The multi-pass resonant cavity 13 is also known as a Fabry-Perot resonator and is comprised of the first mirror 14 and the second mirror 15. The resonant cavity 13, due to its multi-pass nature, acts as a narrow-band frequency discriminator. The only optical frequencies which can be supported by the cavity are those whose wavelength, $\lambda$, satisfy the condition, $$L = \frac{n\lambda}{2}, \quad (1)$$

where n is an integer, and L is the separation between the two mirrors, 14 and 15, of the resonant cavity 13. Any optical radiation whose wavelength does not satisfy the condition described by Eq. 1, will be rejected by the cavity. Only those frequencies whose wavelengths satisfy Eq. 1 will be transmitted by the cavity. If the modulated laser beam 9 illuminating the second mirror has a component which satisfies the criterion given by Eq. 1, then that component will be admitted into the cavity 13. If the laser spectrum has no component which satisfies Eq. 1, then all of the light incident on mirror 15 will be reflected, and will not enter the cavity.

Figure 2:
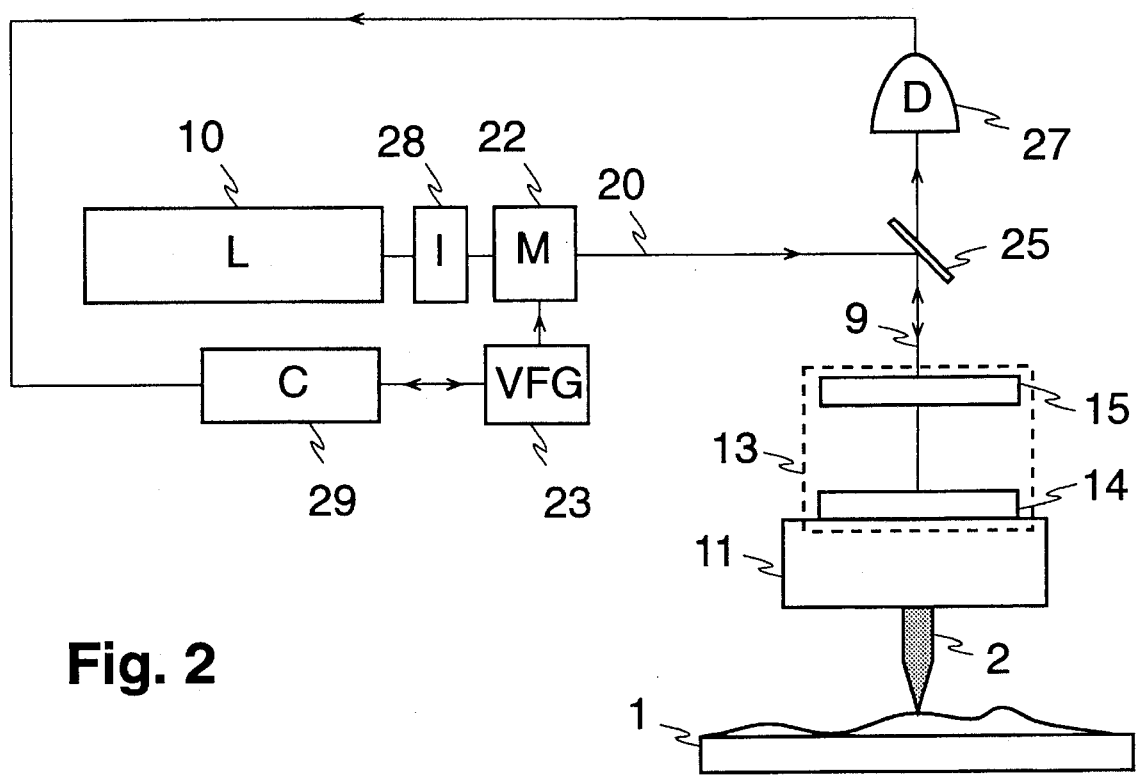
FIG. 2 shows the details of the first embodiment of the invention in which the resonance condition is maintained by varying the modulation frequency.

The stabilized laser system 10 is the light source whose radiation probes the resonant cavity 13. FIG. 2 provides additional details of the first embodiment. The output of the laser 10 is incident on a modulator 22 which adds sidebands onto the laser carrier frequency. By varying the modulation frequency $w_m$ of the modulator 22 from the frequency source 23, it is possible to change the frequency of the sideband relative to the fundamental frequency w. The frequencies of the first lower and upper sidebands are at $w-w_m$ and $w+w_m$. These three components ($w-w_m$, w, $w+w_m$) are incident on the mirror 15 of the resonant cavity 13, and by monitoring the reflected radiation it is possible to determine if either of the sidebands of the incident radiation 9 is satisfying Eq. 1.

The sample 1 is moved along an axis with the stylus 2 in contact with the sample 1. Any time the stylus encounters a positive slope on the surface of the sample, the stylus moves resonator mirror 14 upward, decreasing the cavity length and thus changing the resonance cavity modes. If one of the sidebands originally matched one of the resonant frequencies of the Fabry Perot cavity, and the stylus changed the cavity length, then the sideband will no longer match the resonance frequency. A feedback system monitors the reflected radiation and adjusts the modulation frequency $w_m$ to determine the new resonance frequency and thus to determine the new cavity length corresponding to the new resonance frequency. The change in modulation frequency can be used to calculate exactly the change in cavity length, which is a direct measure of the height of the local peak sampled by the stylus.

FIG. 2 shows schematically how the resonance condition is re-established by opto-electronic feedback. The output of the frequency stabilized laser 10 is incident on the modulator 22 which is driven by the variable frequency RF source VFG 23. The modulator can be an electro-optical or acousto-optical frequency modulator. As already described, the modulator adds frequency sidebands $w+w_m$ and $w-w_m$ onto the laser carrier frequency. This modulated laser beam 20, after being redirected by a beam splitter 25, is incident on the Fabry-Perot resonator 13. If one of the sidebands is resonant with the cavity, then it will be transmitted through the Fabry Perot cavity. The other components are reflected and the radiance of this return beam, after passing through the beam splitter 25, is measured by a detector 27. An optical isolator 28 prevents undesired optical feedback into the laser 10. By monitoring the reflected radiation from the Fabry Perot cavity, the modulation frequency is adjusted by a control system 29 so that the sideband is continually transmitted through the cavity. As the stylus moves up and down, changing the cavity spacing, the modulation frequency increases and decreases to maintain resonance. The relationship between the change in modulation frequency $\Delta w_m$ and the change in cavity distance $\Delta L$ is given by:

$$\Delta L = L \frac{\Delta w_m}{w} \quad (2)$$

where w is the stabilized carrier frequency and L is the initial cavity length. The control system 29 calculates the change in cavity distance from the change in modulation frequency. For example: if the actual change in cavity distance is 5 Å, for an initial cavity length of 5 cm, illuminated by an atomic-transition-stabilized laser system whose wavelength is 1 micron, then the change in modulation frequency is 3 MHz. This example demonstrates the sensitivity of this technique for modulation frequencies that are well within reach of commercially available modulators.

Alternative Embodiments

Figure 3:
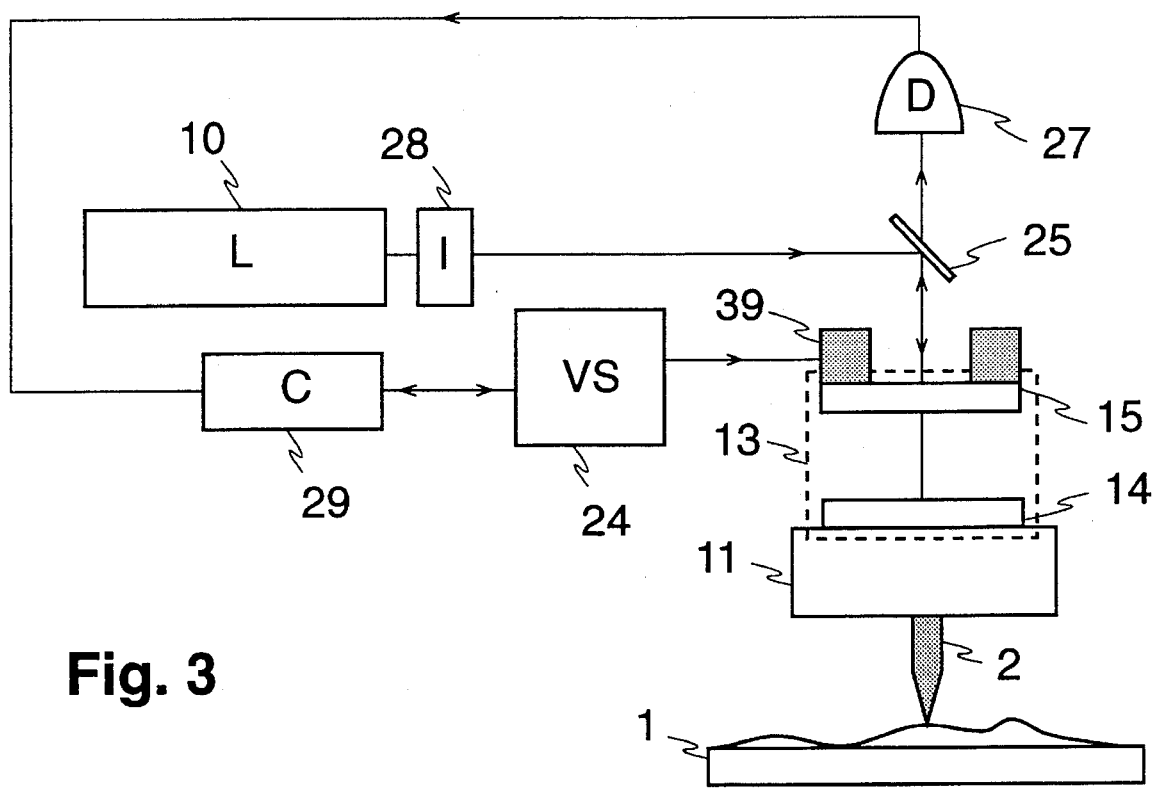
FIG. 3 shows the details of the second embodiment of the invention in which the resonance condition is maintained by keeping the cavity length constant.

FIG. 3 shows an alternative embodiment for the surface profilometer. In the original system shown in FIG. 2, the modulation frequency is adjusted to keep the sideband on resonance with the changing cavity length. In the alternative embodiment shown in FIG. 3, the cavity length is kept constant so there is no need for a modulation system. The mirror 15 of the resonant cavity 13 is mounted on a position actuator (such as a piezo-electric transducer or PZT) 39 which maintains the length of the cavity constant. The laser output is incident on the resonant cavity as before. Rather than changing the modulation frequency to adjust the sideband and maintain resonance, the position actuator adjusts the cavity length to maintain it constant. As the stylus moves up and down changing the altitude of mirror 14, the position actuator adjusts mirror 15 to maintain cavity spacing as a constant. In the first embodiment, the signal from the reflected radiation from the resonator was monitored, and the feedback system changed the modulation frequency to maintain resonance. In this embodiment, the feedback system adjusts the mirror 15 via the position actuator 39 to keep the cavity spacing constant. The voltage applied to the position actuator 39 by the voltage source 24 to maintain the cavity spacing at a constant is directly translated into displacement information, by the control system 29, to provide profilometry measurement data.

There are certain advantages associated with each of the two embodiments mentioned. The frequency modulation cavity length measurement in the first embodiment does not require a PZT position actuator to move the reference mirror 15. The maintained-length cavity embodiment of FIG. 3 can operate with the fundamental frequency of light, which has certain discrimination advantages over the use of sidebands. In addition, it is possible, by combining the frequency modulation of the first embodiment with the position actuator (e.g., PZT) of the second embodiment, to utilize the strengths of the two techniques in a combined system.

Features of the Profilometer

For most profilometry operations it is very important for the stylus probe 2 to be brought into contact with the surface of the sample 1 carefully, before commencing to scan for profilometry. One of the advantages of this invention is that the surface can be found very easily through the algorithm described below. In addition, it is possible to use the same principles for hardness measurement.

Contacting Algorithm

Initially the entire assembly, consisting of the probe 2, the mounting fixture 11 and the Fabry-Perot resonator 13, is suspended above the sample 1 so that the stylus 2 is not in contact with the sample. The modulation frequency required to maintain the laser sideband at resonance with the cavity should be constant since the cavity length is not changing. As the entire assembly is lowered onto the sample, the cavity length will remain constant and the modulation frequency will not change as long as the stylus does not touch the sample. As soon as the stylus does touch the sample, then the mirror 14 of the resonant cavity 13 will be deflected and the cavity length will change. Consequently, the modulation frequency will change to maintain resonance. As soon as the control unit sees a change in the modulation frequency, then it will recognize that contact has been established and will halt the lowering of the entire assembly to the sample. The system is now ready to begin making surface profiling measurements. The contacting algorithm just described is independent of which of the two embodiments (or combination) is utilized.

Hardness Measurement

The profiler is also useful as a hardness measurement device. Hardness measurement is carried out as follows. Scanning (X/Y) motion is stopped at a selected measurement position. Hardness measurement requires selection of a stylus with sufficient probe point hardness and appropriate point configuration to accomplish penetration. This also requires, at high precision, a two-step process: first to find the surface of the sample 1 at a (non-penetrating) level of force; and, second, to determine the depth of penetration of the surface with a second (partially penetrating) level of force.

Hardness is measured by monitoring the 'velocity' pattern of the stylus probe 2, i.e., the rate at which the vertical position of the stylus changes as it penetrates the sample 1. Since such rate will vary from material to material depending on its hardness, the rate will be an indication of the hardness. For multilayer structures, different penetration rates will be measures of the density of the various layers. In addition, for very thin layers, the device and method will also enable measurement of the thicknesses of the layers.

Stylus Carrier

Two possible systems are now described for holding the stylus tip over the sample with a small downward force to maintain contact with the sample. FIG. 4 shows an air-bearing stylus carrier subassembly. Stylus probe 2 is carried on an air bearing. The stylus probe is held within a cylinder 30 on a piston 31 which has such dimensions as to provide only a few microns clearance around the piston along its sides, and seals with piston ring 32 at the top. Piston ring 32 and probe bearing 33 keep the stylus 2 aligned. The air bearing is calibrated to maintain the stylus essentially weightless, with just enough apparent weight (downward force) to keep the stylus 2 in contact with the sample surface as the sample 1 is scanned under the stylus 2. Air pump 34 and a monitoring variable control valve 35 maintain sufficient air flow to float piston 30 with nominal weight to permit contour following on sample 1 by stylus probe 2.

FIG. 5 shows a magnetic stylus carrier subassembly. Stylus 2 is carried by an applied magnetic field. The stylus is held in a cylinder 30 on a piston 31 which has such dimensions as to provide only a few microns clearance around the piston. The magnetic field is calibrated to hold the stylus with just enough downward force to keep it in contact with the surface as the sample 1 is scanned under the stylus 2. Piston ring 36 and probe bearing 33 keep the stylus 2 aligned. Electrical current in coil 37 interacts magnetically with magnetic material in piston 38 (shown schematically as a small coil and a weighted arrow) to provide magnetic attraction substantially equal to piston weight, with just enough apparent weight (downward force) to cause the stylus 2 to follow the profile of the sample 1.

Components

Suitable stylus probes can be purchased, for example from phonograph needle suppliers.

Diamond tips are preferred.

Suitable controllers are available from a number of suppliers, such as MetraByte, Taunton, Mass.

Suitable computers are available from a number of suppliers, such as IBM, Armonk N.Y.

Suitable x-y stages are available from a number of sources, such as Newport Corporation, Irvine, Calif.

Suitable piezoelectric transducers are available from a number of sources, such as Polytec PI, Costa Mesa, Calif.

Suitable commercial laser systems are available such as those from Lightwave Electronics Corporation. With some modifications these lasers can be converted into stabilized light sources referenced to an atomic transition.

Suitable modulators are available from several companies such as New Focus in Sunnyvale, Calif., or Ramar Corporation in Boston, Mass.

SUMMARY OF OPERATION

Two preferred embodiments have been described. Both embodiments require that a stabilized laser 10 be used to provide a frequency standard to measure the changes in the length of a resonant cavity 13.

In the first embodiment, FIG. 2 shows how the stabilized laser system is modulated by an electro- or acousto-optical frequency modulator 22 to generate sidebands at $w-w_m$ and $w+w_m$, where w is the laser frequency carrier and $w_m$ is the modulation frequency from the variable frequency source 23. As the cavity 13 changes length due to the stylus 2 moving across the sample, the modulation frequency is changed by the feedback system to maintain resonance. The control system 29 monitors the light rejected by the cavity 13 via the detector 27 to adjust the modulation frequency so that one of the sidebands is always on resonance. The change in modulation frequency required to maintain resonance is directly related to the surface profile according to Eq. 1 and is calculated by the control system 29.

In the alternative embodiment, illustrated in FIG. 3, the laser illumination is not modulated but is directly incident on the resonant cavity 13. Again the detector 27 monitors the radiation rejected by the cavity, but the feedback signal is fed to the position actuator 39 which adjusts the mirror 15 of the cavity 13 so that the cavity spacing is maintained constant. In this embodiment the cavity length and the stabilized frequency are maintained constant. The voltage required to be applied to the position actuator to keep the cavity length constant is a direct measure of the surface profile as determined by the control system 29.

While the invention has been shown and described with respect to preferred embodiments, it will be clear to those with skill in the art that various changes in form and detail may be made without departing from the spirit and scope of the invention.

The invention claimed is:

1. A contact surface profilometry system for taking measurements of the surface profile of a sample (1), comprising:
    a) an optical resonator having a resonance cavity (13) having an optical axis and defined by an axially movable first mirror (14) and a second mirror (15) perpendicular to the same optical axis and aligned for resonance;
    b) an axial stylus probe (2) fixed to said first mirror (14) of said optical resonator (13) at its axis so as to provide axial expansion and contraction of said cavity (13) as a function of the surface of profile of said sample (1) as the surface said sample is traversed by said stylus probe;
    c) frequency-stabilized laser means (10) for providing said optical resonator (13) with an optical signal along said optical axis at a stabilized reference frequency;
    d) optical/electronic feedback means (27,29) responsive to dimensional change of the cavity of said optical resonator (13) to provide a displacement signal which is a function of axial dimensional change of said cavity resulting from displacement of said axial stylus probe (2) due to surface profile of said sample; and
    e) means (29) to control relative descending/ascending and scanning motions between said sample and to convert said displacement signal into profilometry measurement values.

2. A contact surface profilometry system according to claim 1, further characterized in that said stylus probe (2) is mounted to optical resonator (13) by stylus probe carrier (11), an air bearing calibrated to apply only the minimum downward pressure required for maintaining said probe in contact with the profile of said sample.

3. A contact surface profilometry system according to claim 1, further characterized in that said stylus probe (2) is mounted to optical resonator (13) by stylus probe carder (11), a magnetic device calibrated to apply only the minimum downward pressure required for maintaining probe contact with the profile of said sample.

4. A contact surface profilometry system, for taking measurements of surface feature profiles of a sample, comprising:
    a) an optical resonator having a resonance cavity (13) defined by an axially movable first mirror (14) and a second mirror (15) perpendicular to the same optical axis and aligned for resonance;
    b) an axial stylus probe (2) fixed to said first mirror (14) of said optical resonator (13) so as to provide axial expansion and contraction of said cavity (13) as a function of the surface profile of said sample (1);
    c) stabilized laser means (10) for providing said optical resonator (13) with an optical signal along said axis at a reference frequency;
    d) optical and electronic feedback loop means (27, 29, 23, 22, 20, 25, 9) responsive to dimensional change of the cavity of said optical resonator (13) to provide a displacement signal which is a function of axial dimensional change of said cavity (13) resulting from displacement of said probe (2) due to surface profile of said sample; and
    e) a set of optical and electronic devices interconnected with said optical resonator (13) to provide a measurement of profile by calculating the extent of probe (2) displacement from the changes required to re-establish resonance at each new location as said probe scans a surface profile of a sample (1) to be measured.

5. A surface profilometry system according to claim 4, in which said optical and electronic devices provide feedback values of profile changes of said sample, which is accomplished by measuring the change in optical frequency required to maintain resonance of said cavity (13) with the changing cavity length.

6. A surface profilometry system according to claim 4, in which said optical and electronic feedback means comprises a variable frequency source (23) and optical modulator (22) which generates RF sidebands onto the stabilized laser frequency, making it possible to track the change in cavity resonance frequency by changing the modulation frequency.

7. A surface profilometry system according to claim 4, in which said optical and electronic feedback means measures the change in cavity length required to maintain resonance with the stabilized laser frequency of said stabilized laser means (10).

8. A surface profilometry system according to claim 7, in which said optical and electronic feedback means comprises a position actuator (39) which maintains the cavity at a fixed length to maintain resonance with the stabilized laser frequency.

9. A surface profilometry system according to claim 4, in which said optical and electronic feedback means (20–29) comprises a variable frequency source (23) and optical modulator (22) which generates RF sidebands onto the stabilized laser frequency, making it possible to track the change in cavity resonance frequency by changing the modulation frequency, and in which said optical and electronic feedback means also comprises a position actuator (39) to provide an altered cavity length.

10. A surface profilometry system to initiate contact with a sample (1), comprising
    a) an optical resonator having a resonance cavity (13) defined by an axially movable first mirror (14) and a second mirror (15) perpendicular to the same axis and aligned for resonance;
    b) an axial probe (2) fixed to said first mirror (14) of said optical resonator (13) so as to provide axial expansion and contraction of said cavity as a function of the surface profile of said sample (1) and to serve as both a surface finder probe in contact-initiation mode and a probe in depth-finder mode;
    c) frequency-stabilized laser means (10) for providing said optical resonator (13) with an optical signal along said axis at a reference laser carrier frequency, and simultaneously to supply first upper and lower sideband frequencies which are subject to variation by a modulation frequency signal;
    d) optical and electronic feedback means (27, 29) responsive to dimensional change of said cavity of said optical resonator (13) to provide a displacement signal related to the re-establishment of resonance by varying said modulation frequency signal until resonance of said cavity again occurs, thus using said modulation frequency signals to keep the Fabry-Perot cavity always locked, said displacement signal being determined by the amount of variation required, and being a function of axial dimensional change of said cavity resulting from displacement of said probe (2) due to surface profile of said sample; and
    e) means (29) to convert said displacement signal into profilometry measurement values.

11. The method of operating a surface profilometry system, in which the system comprises a movable stylus assembly, comprising an axial stylus probe (2), a mounting fixture (11), and a resonant cavity (13) with two cavity-defining mirrors (14,15), to initiate contact with a sample (1), consisting of the following steps:
    a) lowering the stylus assembly down toward the said sample while monitoring the resonance condition of the said cavity;
    b) halting the lowering of the said stylus assembly as soon as the resonance condition of the said cavity changes due to contact between the said stylus probe (2) and the surface of said sample (1) which changes the relative separation between the cavity-defining mirrors (14, 15) of the said cavity (13); and
    c) thereafter repeatedly moving said stylus assembly and taking the surface measurement signal from the modulation variation required to maintain relative separation between the cavity-defining mirrors (14, 15) of said cavity (13), using said modulation variation to provide displacement signals to keep the Fabry-Perot cavity always locked, said displacement signal being a function of surface condition.

12. The method of operating a surface profilometry system according to claim 11, consisting of the following additional steps after determining that contact with the surface of said sample (1) has been initiated:
    d) providing measured additional downward force to said probe (2) sufficient to accomplish limited penetration of the surface of said sample during a time period absent lateral movement of said probe; and
    e) calculating the surface hardness as a function of depth of penetration.

13. The method of operating a surface profilometry system according to claim 11, consisting of the following additional steps after determining that contact with the surface of said sample has been initiated:
    d) providing measured additional downward force to said probe (2) sufficient to accomplish limited penetration of the surface of said sample during a time period absent lateral movement of said probe; and
    e) monitoring the rate of change of the resonant cavity (13) length, thereby determining the velocity of probe penetration; and
    e) calculating the surface hardness as a function of the velocity of said probe (2) penetration of the said sample.

14. A surface profilometry system for taking measurements of the surface hardness of a sample, comprising:
    a) an optical resonator having a resonance cavity (13) defined by an axially movable first mirror (14) and a second mirror (15) perpendicular to the same axis and aligned for resonance;
    b) an axial penetrating probe (2) fixed to said first mirror (14) of said optical resonator (13) so as to provide axial expansion and contraction of said cavity as a function of the surface profile of said sample and to serve as both a surface finder probe in contact initiation mode and a penetrating probe in hardness testing mode;
    c) means (10) for providing said optical resonator (13) with an optical signal along said axis at a reference frequency, generating sidebands subject to variation by a modulation frequency;
    d) optical and electronic feedback means (27, 29) responsive to dimensional change of the cavity of said optical resonator (13) to provide a displacement signal which is a function of axial dimensional change of said cavity resulting from displacement of said probe (2) due to surface profile of said sample and due to surface penetration; and
    e) means (29) to convert said displacement signal into profilometry measurement and hardness values by first finding the surface by monitoring variations of modulation frequency required to re-establish resonance with a first displacement signal after first probe/surface contact, using the variation of modulation frequency signals to keep the Fabry-Perot cavity always locked and provide a second displacement signal after penetration, the relationship of said first and second displacement signals being a function of surface hardness.

* * * * *